US009245558B1

(12) United States Patent  
Boyle

(10) Patent No.: US 9,245,558 B1  
(45) Date of Patent: Jan. 26, 2016

(54) ELECTRONIC SYSTEM WITH DATA MANAGEMENT MECHANISM AND METHOD OF OPERATION THEREOF

(71) Applicant: Western Digital Technologies, Inc., Irvine, CA (US)

(72) Inventor: William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/539,847

(22) Filed: Nov. 12, 2014

Related U.S. Application Data

(60) Provisional application No. 61/991,341, filed on May 9, 2014.

(51) Int. Cl.  
*G11B 21/02* (2006.01)  
*G11B 5/56* (2006.01)  
*G05B 15/02* (2006.01)

(52) U.S. Cl.  
CPC . *G11B 5/56* (2013.01); *G05B 15/02* (2013.01)

(58) Field of Classification Search  
None  
See application file for complete search history.

(56) References Cited

U.S. PATENT DOCUMENTS

| | | | |
|---|---|---|---|
| 5,493,676 A * | 2/1996 | Amundson | 714/42 |
| 5,530,850 A | 6/1996 | Ford et al. | |
| 5,933,840 A | 8/1999 | Menon et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,336,164 B1 | 1/2002 | Gerdt et al. | |
| 6,337,778 B1 | 1/2002 | Gagne | |

(Continued)

*Primary Examiner* — K. Wong

(57) ABSTRACT

An apparatus includes: a media; a head over the media; a head actuation motor coupled to the head; control circuitry, coupled to the head actuation motor, configured to position the head; and an environmental sensor, coupled to the control circuitry, configured to measure an environmental condition; wherein the control circuitry is further configured to: perform a background task; and adjust a frequency of the background task based on the magnitude of the environmental condition.

35 Claims, 5 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,611,852 B1 | 8/2003 | Morley et al. |
| 6,615,312 B1 | 9/2003 | Hamlin et al. |
| 6,629,113 B1 | 9/2003 | Lawrence |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,730 B2 | 11/2005 | Chamberlin et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |

(56) References Cited

U.S. PATENT DOCUMENTS

| | | |
|---|---|---|
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,707,166 B1 | 4/2010 | Patterson |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,788,446 B2 * | 8/2010 | Kurtas et al. .................. 711/111 |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |

(56) References Cited

U.S. PATENT DOCUMENTS

| | | |
|---|---|---|
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,341,339 B1 | 12/2012 | Boyle et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,521,972 B1 | 8/2013 | Boyle et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 * | 4/2014 | Boyle .............................. 360/75 |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,725,931 B1 | 5/2014 | Kang |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2008/0294814 A1 | 11/2008 | Gorobets |
| 2009/0031066 A1 | 1/2009 | Bansal et al. |
| 2009/0113702 A1 | 5/2009 | Hogg |
| 2009/0198946 A1 | 8/2009 | Ebata |
| 2010/0287217 A1 | 11/2010 | Borchers et al. |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0031406 A1 | 1/2013 | Cho |
| 2014/0201424 A1 | 7/2014 | Chen et al. |

\* cited by examiner

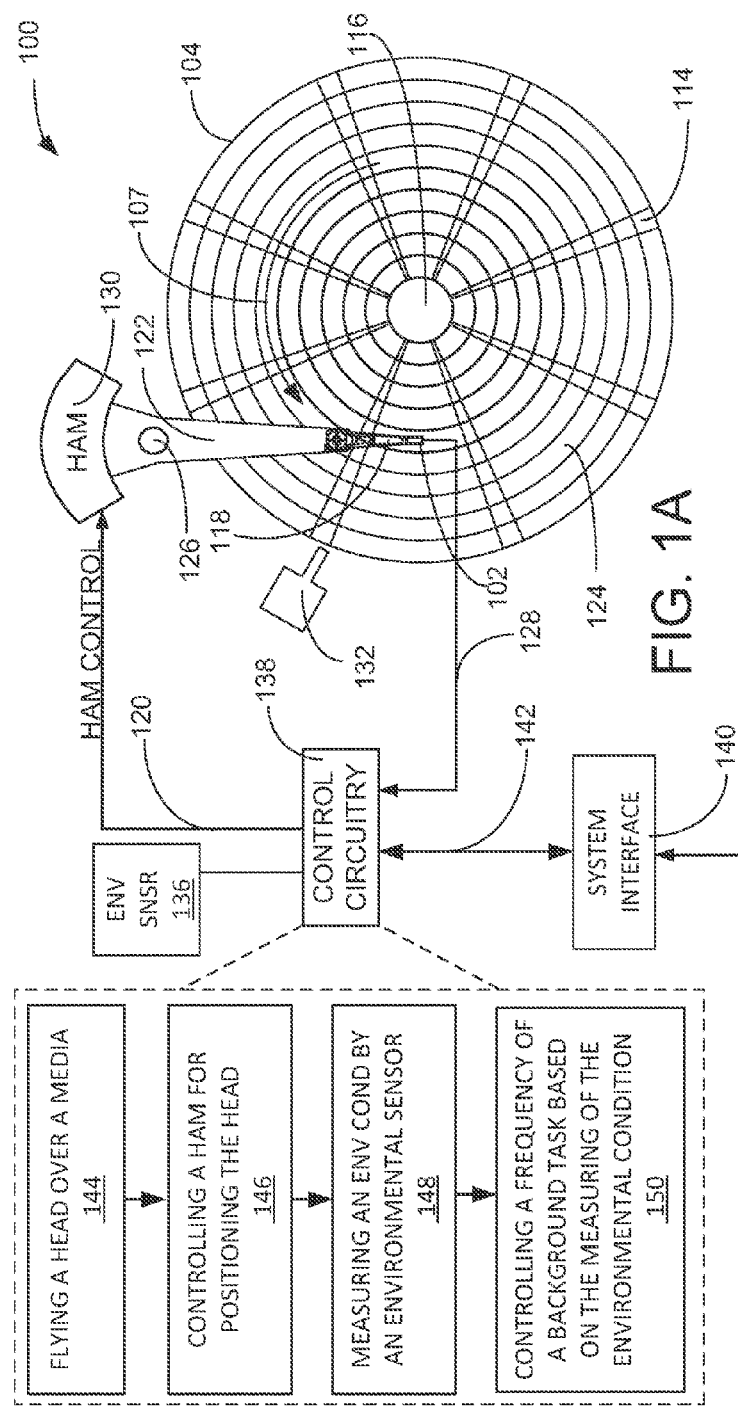

ELECTRONIC SYSTEM WITH DATA MANAGEMENT MECHANISM AND METHOD OF OPERATION THEREOF

CROSS-REFERENCE TO RELATED APPLICATION(S)

This application claims the benefit of U.S. Provisional Patent Application Ser. No. 61/991,341 filed May 9, 2014, and the subject matter thereof is incorporated herein by reference thereto.

TECHNICAL FIELD

An embodiment relates generally to an electronic system, and more particularly to a system for data management.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

As recording technologies advance in hard disk drives, the Tracks-Per-Inch (TPI) has increased. This has become increasingly challenging to maintain the writer element over the center of the track as the tracks have become closer together. Protecting adjacent tracks from corruption from the current track writing operation is one of the most important reasons to keep the writer element over the center of the track

BRIEF DESCRIPTION OF THE DRAWINGS

FIGS. 1A, 1B, 1C, and 1D show an operational diagram of an electronic system with data management according to an embodiment.

DETAILED DESCRIPTION

Figure 1D:
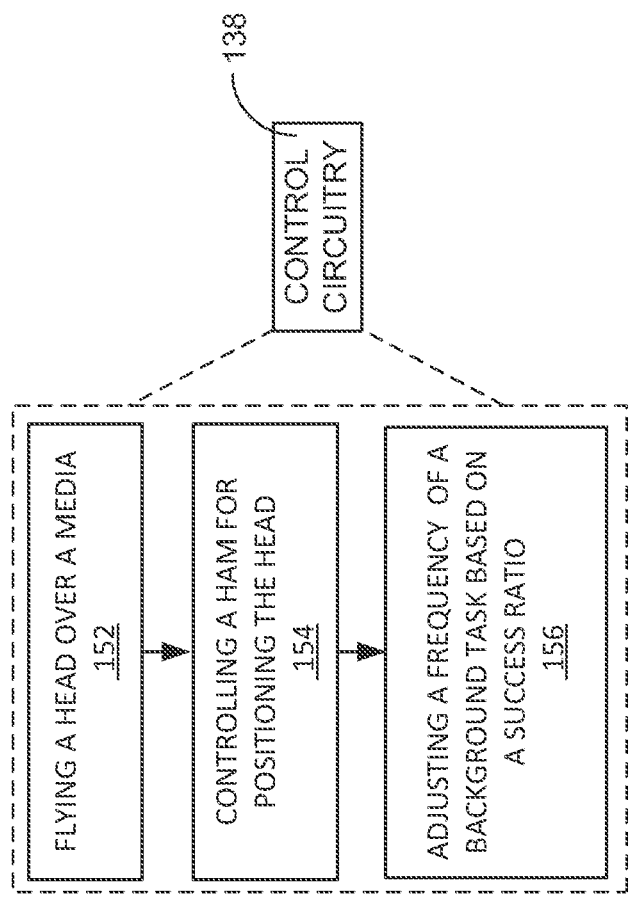

Storage systems can include storage devices, such as hard disk drives (HDD) and hybrid drives utilizing shingle magnetic recording (SMR) heads, manage the capacity utilization during writes. In order to maintain data integrity many of the storage devices perform off-line or background tasks, such as garbage collection (GC), file defragmentation, or data reliability verification, that concentrate the written data into a smaller sector space than it was originally written. These processes can be interleaved with interface tasks (e.g., operations generated via commands received through a host interface) in order to minimize the latency seen by the storage system host. By way of an example, the GC tasks can be interleaved at a rate of 1 background task per 10 interface tasks.

Under an external vibration environment, staying over the center of the track becomes more difficult. As an example, the position of the write element can be sampled and when a sample is greater than a threshold distance from the track center, the write operation is aborted. As the vibration level increases, the abort occurrence rate increases.

In a system with limited in-place retries, the write operations continue after repositioning the write element further down the shingled track or on a non-shingled track. This wastes the intervening space and increases the background tasks.

In a system that has a verify task after a write operation of data, a verify failure can cause a re-write of data after repositioning the write element further down the shingled track or on a non-shingled track. This also wastes the intervening space and reduces the efficiency of the background tasks.

If the inefficiency reduces to a point where the amount of wasted space that is greater than the amount of consolidated free space that is created then the GC task causes an increase in urgency instead of a decrease in urgency. If left unchecked this could cause the drive to become inoperable.

Some embodiments modify the urgency and the aggressiveness of background tasks, such as garbage collection, based on the current vibration level at the drive. As the vibration level at the drive increases, the urgency of the background tasks can be relaxed. As the vibration level decreases, the urgency level for the activities can increase in order to reduce the backlog of operations needed to keep usable capacity in balance. The manipulation of the urgency in preparation for times of higher vibration can be implemented by changing the interleave ratio between the background tasks and interface tasks.

It is understood that the background tasks are initiated and managed within the electronic system. The interface tasks differ from the background tasks because all interface tasks are initiated by the host system and transferred through the system interface.

A need still remains for an electronic system as an embodiment with data management mechanism for managing the urgency of background tasks. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes may be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation. The various embodiments have been numbered first embodiment, second embodiment, etc. as a matter of descriptive convenience and are not intended to have any other significance or provide limitations for an embodiment.

Referring now to FIGS. 1A, 1B, 1C, and 1D, therein are shown an operational diagram of an electronic system 100 according to an embodiment. The electronic system 100 can represent an apparatus for one of the various embodiments. Various embodiments can include the embodiment depicted in FIGS. 1A, 1B, 1C, and 1D which by way of an example is shown as a hard disk drive although it is understood that the electronic system 100 can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information on data tracks 124. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably on the data tracks 124.

The spindle motor 116 can rotate the media 104, about a center of the media 104, at constant or varying speed 107. For illustrative purposes, the spindle motor 116 is described as a motor for a rotation, although it is understood that the spindle motor 116 can be other actuating motors for a tape drive, as an example.

As examples, a head actuation motor 130 can be a voice coil motor assembly, a stepper motor assembly, or a combination thereof. The head actuation motor 130 can generate a torque or force for positioning the head 102. An environmental sensor 136 can detect and measure any environmental disturbance that can affect the positioning of the head 102.

A tapered end of the flex arm 118 can support the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138. The control circuitry 138 can measure a magnitude of the environmental disturbance, through the environmental sensor 136, and calculate a feed forward adjustment for the head actuation motor 130.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions or detect magnetic transitions from the data tracks 124 recorded in the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a non-volatile memory, or a combination thereof. For example, the nonvolatile storage can be non-volatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer interface tasks 142 between the host electronics and the control circuitry 138. The interface tasks 142 can be encoded or decoded by the control circuitry 138 in preparation for transfer to or from the media 104.

The control circuitry 138 can be configured to control the spindle motor 116 for adjusting the speed 107 of the media 104. The control circuitry 138 can be configured to cause the head 102 to move relative to the media 104, or vice versa. The control circuitry 138 can be configured to control the speed 107 of the media 104 and the position of the head 102 by reading servo sectors 114 strategically placed on the media 104. The servo sectors 114 can be recorded on the media 104 during a manufacturing process. The control circuitry 138 can also be configured to control the flow of information to the head 102 for writing to the media 104. The information sent to the head 102 can include the preconditioning pattern, direct current erase signals, user data, or a combination thereof. The control circuitry 138 can retrieve the recorded information and monitor the servo sectors 114 through a read signal 128 provided by the head 102.

In an embodiment, the electronic system 100 further comprises control circuitry 138 configured to execute the flow diagrams of FIG. 1C. As an example, actions 144 to 150 can represent the flow diagram where an embodiment is employing a data management mechanism for maintaining data integrity.

In an action 144, the head 102 is flown over the media 104 during execution by the electronic system 100, such as a manufacturing test fixture, a hard disk drive, a tape drive, or a hybrid drive.

In an action 146, the control circuitry can control the position of the head by monitoring the servo information detected by reading the servo sectors. The control circuitry 138 can detect the actual position of the head relative to the intended position of the head by monitoring a position error signal (PES).

In an action 148, an environmental condition, such as an environmental vibration, can be measured during execution by the electronic system 100. The relative strength of the environmental condition can be determined by analysis of the PES. In background tasks, such as garbage collection, file defragmentation, an excessive amount of position error will cause a decrease in packing density and result in little or no release of wasted capacity.

In an action 150, the control circuitry can control a frequency of the background task based on the measuring of the environmental condition. For example, frequency can be adjusted by controlling the execution interleave ratio as compared to the interface tasks. By way of an example, the background task interleave ratio can be running at one background task to 10 interface tasks. After the environmental vibration has passed, the urgency of the background task can be increased beyond where had previously been running. The increased urgency can, for example, increase the interleave ratio to five background tasks to 10 interface tasks. This increase in the interleave ratio can help to catch-up with the backlog of work that was created by reducing the frequency of the background task.

In an embodiment, the electronic system 100 further comprises control circuitry 138 configured to execute the flow diagrams of FIG. 1D. As an example, actions 144 to 150 can represent the flow diagram where an embodiment is employing a data management mechanism for maintaining data integrity.

In an action 152, the head 102 is flown over the media 104 during execution by the electronic system 100, such as a manufacturing test fixture, a hard disk drive, a tape drive, or a hybrid drive.

In an action 154, the control circuitry can control the position of the head by monitoring the servo information detected by reading the servo sectors. The control circuitry 138 can detect the actual position of the head relative to the intended position of the head by monitoring a position error signal (PES).

In an action 156, an environmental condition, such as an environmental vibration, can be measured during execution by the electronic system 100. The relative strength of the environmental condition can be determined by analysis of the PES. In background tasks, such as garbage collection, file defragmentation, an excessive amount of position error will cause a decrease in packing density and result in little or no release of wasted capacity.

In an action 158, the control circuitry can calculate a success ratio for controlling a frequency of the background task based on the magnitude of the environmental condition. For example, frequency can be adjusted by controlling the execution interleave ratio as compared to the interface tasks. After the environmental vibration has passed, the urgency of the background task can be increased beyond where had previously been running. The increased urgency can, for example, increase the interleave ratio to five background tasks to 10 interface tasks. This increase in the interleave ratio can help to catch-up with the backlog of work that was created by reducing the frequency of the background task.

It has been discovered that an embodiment of the electronic system 100 can improve the overall performance. The electronic system 100 can balance interface tasks and background tasks in order to maintain the optimum capacity and performance of the interface tasks.

Figure 2:
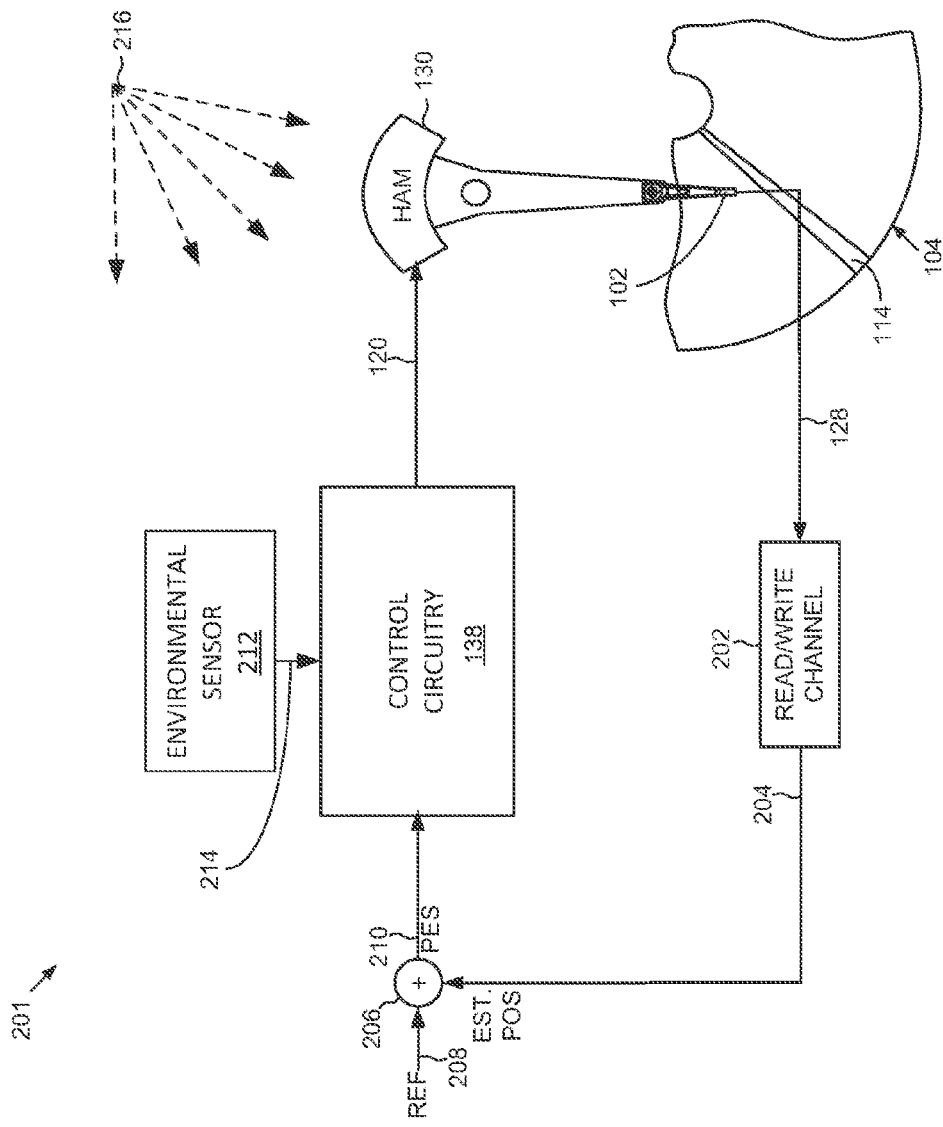
FIG. 2 shows a servo control system, of the electronic system 100, for controlling a frequency of background tasks in the presence of environmental conditions, in accordance with an embodiment.

Referring now to FIG. 2, therein is shown a servo control system 201, of the electronic system 100, for controlling a frequency of background tasks in the presence of environmental conditions, in accordance with an embodiment. The servo control system 201 for controlling the head actuation motor 130 in order to position the head assembly 102 radially over the media 104. A read/write channel 202 demodulates the read signal 128 into an estimated position 204 for the head assembly 102 relative to the data track 124 of FIG. 1A on the media 104. The estimated position 204 is applied to a first adder 206 for subtracting a reference position 208 in order to generate a position error signal (PES) 210. The control circuitry 138 can monitor the output of an environmental sensor 212 for adjusting the response to the PES 210 in order to generate the HAM control signal 120.

It has been discovered that an environmental condition magnitude 214 of an environmental condition 216, such as an environmental vibration, a periodic shock, or an acoustic pressure wave can be monitored by the environmental sensor 212. A magnitude of the environmental condition 216 can be monitored by the control circuitry 138 for generating the HAM control signal 120 to prevent large tracking errors normally observed when the environmental condition magnitude 214 increases the magnitude of the PES 210. The control circuitry 138 can also manage the execution of background tasks, such as garbage collection, file defragmentation, data compression, data encryption, or a combination thereof based on thresholds established for the environmental condition magnitude 214 of the environmental condition 216.

The execution of the background tasks can be controlled by the control circuitry 138 based on the magnitude of the PES 210, analysis of the rate of change of the PES 210 or the environmental condition magnitude 214 of the environmental condition 216, the available capacity of the media 104 of FIG. 1A representing the unused portion of the media 104, the magnitude of the environmental condition magnitude 214 of the environmental condition 216, or a combination thereof. The control circuitry 138 can calculate a success ratio for the completion of the background tasks as compared to the environmental condition magnitude 214 of the environmental condition 216, the PES 210, or a combination thereof.

The control circuitry 138 can calculate the success ratio based on the space consumed (or rate of space consumed) by the background tasks as compared to the environmental condition magnitude 214 of the environmental condition 216, the PES 210, or a combination thereof. The control circuitry 138 can determine the space consumed by monitoring the number of sectors, within the data tracks 124, which are skipped or terminated while writing due to the PES 210 or the environmental condition magnitude 214 of the environmental condition 216 exceeding a threshold for that operation. The threshold can be based on the relative position of the head 102 and the center of the data tracks 124, a change magnitude of the PES 210 or the environmental condition magnitude 214 of the environmental condition 216, or a combination thereof. The control circuitry 138 can utilize historical trends to dynamically adjust the thresholds applied to the PES 210, the environmental condition magnitude 214 of the environmental condition 216, or the combination thereof.

The control circuitry 138 can be configured to monitor the available capacity of the media 104 and the amount of space that is consumed or freed by the execution of the background tasks. In general the execution of the background tasks can increase the available capacity, improve the placement of file fragments, identify bad spots in the media 104, or a combination thereof. When the environmental condition magnitude 214 of the environmental condition 216 increases in magnitude, the execution of the background tasks can consume more space than is freed back to the usable capacity of the media 104.

The control circuitry 138 can be configured to calculate the success ratio based in part by the number of sectors, within the data tracks 124, which are freed by the execution of the background tasks. In some instances, the control circuitry 138 can be configured to calculate the success ratio based in part on the rate of the sectors freed by the background tasks. The control circuitry 138 can utilize the success ratio as calculated to control the frequency of the background tasks relative to the execution of host commands delivered through the system interface 140 of FIG. 1A. By way of an example, the control circuitry 138 can utilize the success ratio to determine an increase threshold and a decrease threshold to adjust the frequency of the background tasks relative to the host commands. In some severe instances, the control circuitry 138 can calculate an abort threshold, to temporarily halt the background tasks, based on the PES 210, the environmental condition magnitude 214 of the environmental condition 216, or a combination thereof.

Figure 3:
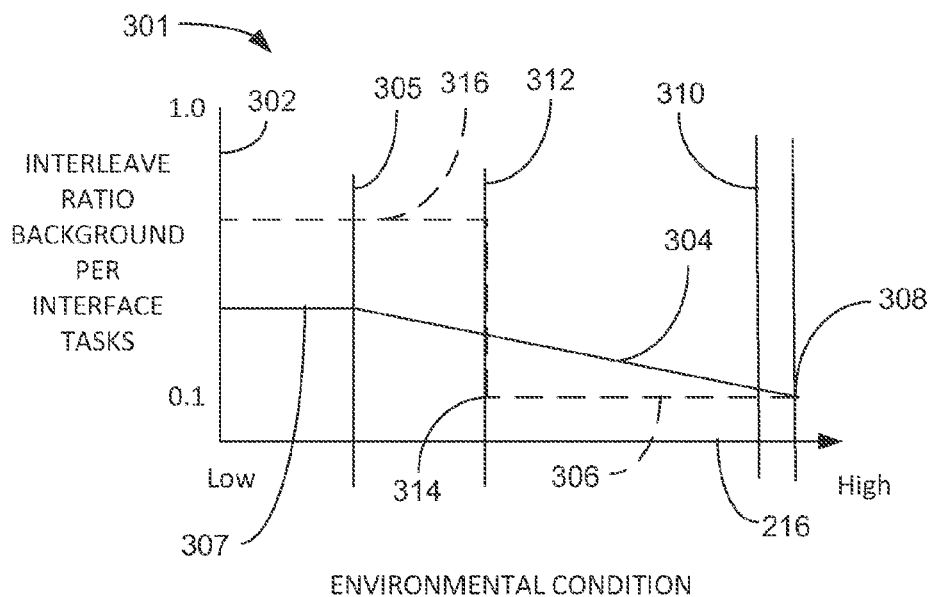
FIG. 3 provides a line graph of performance of an embodiment of a data management system for managing background tasks in the presence of environmental conditions.

Referring now to FIG. 3, therein is shown a line graph of performance of an embodiment of a data management system for managing background tasks in the presence of environmental conditions.

An embodiment monitors the amount of free space that can be consolidated during the background tasks and also monitors the amount of free space consumed by the background tasks. When the electronic system 100 is subjected to environmental condition magnitude 214 of the environmental condition 216 of FIG. 2 there is an increased possibility that the background tasks can consume more space than they can release. An embodiment detects this condition and suspends the background tasks until such time as the vibration environment decreases to a level considered more suitable for GC operations.

When the environmental condition magnitude 214 of the environmental condition 216 decreases to this level, the background tasks can recommence. An embodiment provides a mechanism that keeps a production read counter of data skipped (invalid sectors) or read (valid sectors) from the source zone of the background tasks. There can be another counter of the sectors consumed in the destination zone written to by the background tasks. The consumed sectors can be data successfully written or sectors skipped due to too many write abort events or a verify failure of that sector. When the consumption counter is greater than the production counter, the background tasks have lost efficiency and are consuming space faster than it is freeing space. This is a bad situation and is counterproductive to the purpose of the background tasks. A threshold could be used and compared against the over consumption of space relative to production and shut down the background tasks.

In one embodiment, this system assumes environmental condition is the cause of the degradation of the background tasks. When this event occurs, the environmental condition can be measured and then subsequently monitored. When the environmental condition magnitude 214 of the environmental condition 216 decreases below the level that caused the background tasks ceasing then the background tasks can be resumed. As an example, a minimum reduction of the environmental condition magnitude 214 of the environmental condition 216 can be required to reduce the likelihood of toggling back and forth between the two the background task states (hysteresis can be used).

As shown in FIG. 3, an embodiment can vary an interleave ratio 302, such as a ratio of background tasks to interface tasks, represented by the Y-axis, as a function of the environmental condition magnitude 214 of FIG. 2 of the environmental condition 216 of FIG. 2 represented by the X-axis. By way of example, a trace 304 of the change in the ratio from low environmental condition magnitude 214 of the environmental condition 216 to a high environmental condition magnitude 214 of the environmental condition 216 (solid line), and from high environmental condition magnitude 214 of the environmental condition 216 returning to the low environmental condition magnitude 214 of the environmental condition 216 is represented by a minimum level 306.

In one embodiment, the change in a slope of the trace 304 can be based on a decrease threshold 305 that represents a trigger point to reduce the interleave ratio from an initial value 307. As the environmental condition magnitude 214 of FIG. 2 increases in severity as determined by the environmental condition magnitude 214 of the environmental condition 216, the interleave ratio can be curtailed. By way of an example, the reduction of the interleave ratio can be in a linear fashion or immediately reduced to a flat level. The example of FIG. 3 shows a linear reduction until an abort threshold 308, which represents the measure of the environmental condition magnitude 214 of the environmental condition 216 that can terminate the background tasks or fix them at a minimum level.

In one embodiment, when the environmental condition magnitude 214 of the environmental condition 216 exceeds a hysteresis threshold 310, a reduction in the magnitude of the environmental condition 216 does not increase the interleave ratio until an increase threshold 312 has been reached. The increase can take various forms. For example, the interleave ratio can increase from a hysteresis level 314 to a recovery level (threshold) 316, which is greater than the initial value 307. The interleave ratio can remain at the recovery level 316 until the background task has caught-up with the necessary capacity released to maintain proper operation.

In another embodiment, the interleave ratio can be reduced to zero when the abort threshold 308 is reached and can remain at zero until the environmental condition magnitude 214 of the environmental condition 216 is reduced to the increase threshold 312, which can be less than the decrease threshold 305. When the interleave ratio is adjusted, below the increase threshold 312, it can be adjusted to recovery level 316 in order to catch-up with the background task.

In an embodiment, an increase in the environmental condition magnitude 214 of the environmental condition 216 can cause an increase in the interleave ratio beyond the decrease threshold 305. The increase in the interleave ratio 302 can be necessary to counteract the effects of the environmental condition magnitude 214 in the interface tasks. In the space between the decrease threshold 305 and the hysteresis threshold 310 the ratio can increase in a linear or a non-linear manner. The interleave ratio 302 can be increased in response to the available capacity of the user space. By way of an example the less user capacity that remains, the higher the urgency of the background task to free sectors in the usable capacity.

It has been discovered that the electronic system 100 provides a dynamic adjustment in the interleave ratio 302 of the background tasks to interface tasks within the user capacity. In extreme cases the recovery from extended periods of the environmental condition magnitude 214 of FIG. 2 can impact the performance of interface tasks of the electronic system 100.

The electronic system 100 has been described with module functions or order as an example. The electronic system 100 can partition the modules differently or order the modules differently. For example, the logical block address (LBA) number could be derived from the servo information read from the servo track 114 of FIG. 1A on the media 104 of FIG. 1A and passed through the read channel 202 of FIG. 2. This could represent a significant departure from current practices.

The modules described in this application can be implemented as instructions stored on a non-transitory computer readable medium to be executed by the control circuitry 138 of FIG. 1A in the electronic system 100. The non-transitory computer medium can include the memory of the control circuitry 138 in the electronic system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 4:
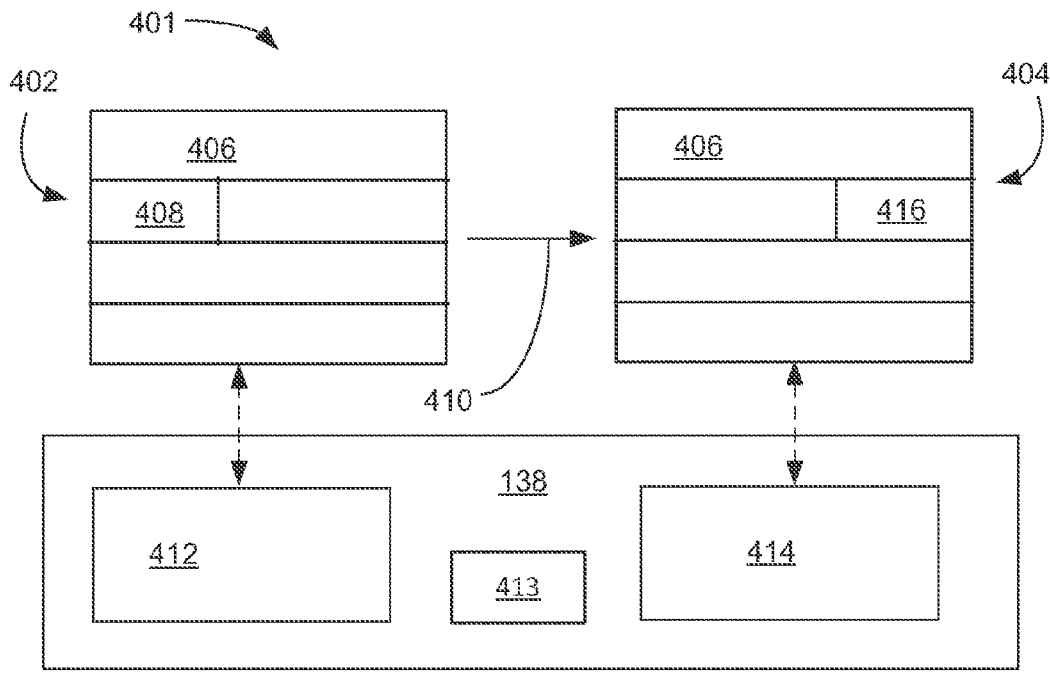
FIG. 4 shows an exemplary block diagram of an apparatus configured to perform a background task in an embodiment.

Referring now to FIG. 4, therein is shown an exemplary block diagram of an apparatus configured to perform a background task 401 in an embodiment. The example of the background task 401 depicts an online region 402 of the media 104 and a background region 404.

The online region 402 can be a data track 124 of FIG. 1A or multiple of the data tracks 124 being accessed through the system interface 140 of FIG. 1A. The online region 402 can contain valid data sectors 406 and invalid data sectors 408. It is understood that the invalid data sectors 408 contain data that is no longer valid because a valid copy of the data is now stored elsewhere.

A background transfer 410 can be monitored by the control circuitry 138, which can maintain a production counter 412 that monitors the successfully recovered units of the valid data sectors 406 recovered from the online region 402. The control circuitry 138 can also maintain a consumption counter 414 to monitor skipped sectors 416 that were write aborts or verify failures. The control circuitry 138 can adjust the urgency of the background transfer 410.

The control circuitry 138 can calculate a success ratio 413 by comparing the production counter 412 to the consumption counter 414. The control circuitry can apply various thresholds to the success ratio 413 in order to manage the interleave ratio 302 of FIG. 3.

Figure 5:
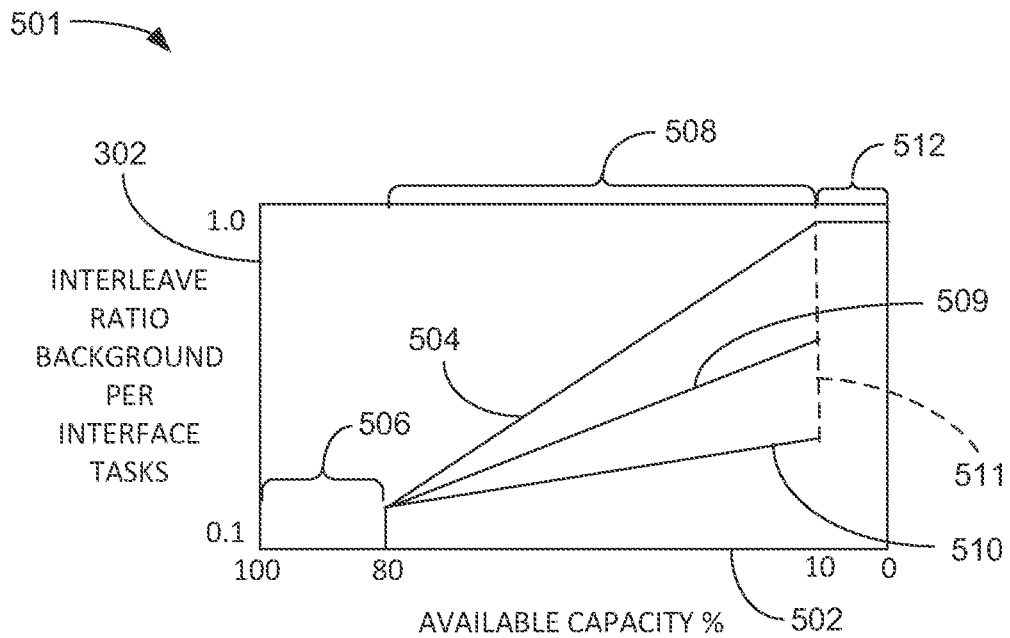
FIG. 5 shows a line graph of performance of an embodiment of a data management system for managing background tasks based on the available capacity percentage.

Referring now to FIG. 5, therein is shown a line graph 501 of performance of an embodiment of the electronic system 100 of FIG. 1A for managing background tasks based on an available capacity percentage 502. The line graph 501 depicts the ratio of the interleave ratio 302 on the y-axis and the available capacity percentage 502 in the x-axis.

A first background task urgency 504 (which in this example is the interleave ratio at a particular remaining capacity point) can be dependent on the remaining available capacity percentage 502 operating under a low level of the environmental condition magnitude 214 of FIG. 2. As the available capacity percentage 502 decreases, the first background task urgency 504 can increase. While the first background task urgency 504 is shown as a linear increase, it understood that the increase of the first background task urgency 504 can have other profiles.

A second background task urgency 509 (which in this example is the interleave ratio at a particular remaining capacity point) can be dependent on the remaining available capacity percentage 502 operating under a medium level of the environmental condition magnitude 214. As the available capacity percentage 502 decreases, the second background task urgency 509 can increase. While the second background task urgency 509 is shown as a linear increase, it understood that the increase of the second background task urgency 509 can have other profiles.

A third background task urgency 510 (which in this example is the interleave ratio at a particular remaining capacity point) can be dependent on the remaining available capacity percentage 502 operating under a high level of the environmental condition magnitude 214. As the available capacity percentage 502 decreases, the third background task urgency 510 can increase. While the third background task urgency 510 is shown as a linear increase, it understood that the increase of the third background task urgency 510 can have other profiles.

An idle range 506 can indicate that there is no execution of the background task 401 of FIG. 4. The idle range 506 can be in effect until the available capacity percentage 502 reaches 80%. In an operational range 508, as the available capacity percentage 502 decreases from 80% to 10%, the increase in the first background task urgency 504 can be altered by the environmental condition magnitude 214 of the environmental condition 216 of FIG. 2. An adjusted urgency 511 can represent an example of a capacity trigger point for increasing the first background task urgency 504, the second background task urgency 509, and third background task urgency 510 independent of the environmental condition 216.

In an urgency range 512, when the available capacity percentage 502 is for example 10% or less, the first background task urgency 504, the second background task urgency 509, and third background task urgency 510 are set to a maximum of the interleave ratio 302 in order to regain needed capacity to maintain operation of the electronic system 100. It is understood that the profile of the first background task urgency 504, the second background task urgency 509, and third background task urgency 510 are examples only and may differ depending on the environmental condition magnitude 214, the available capacity percentage 502, or the combination thereof.

Figure 6:
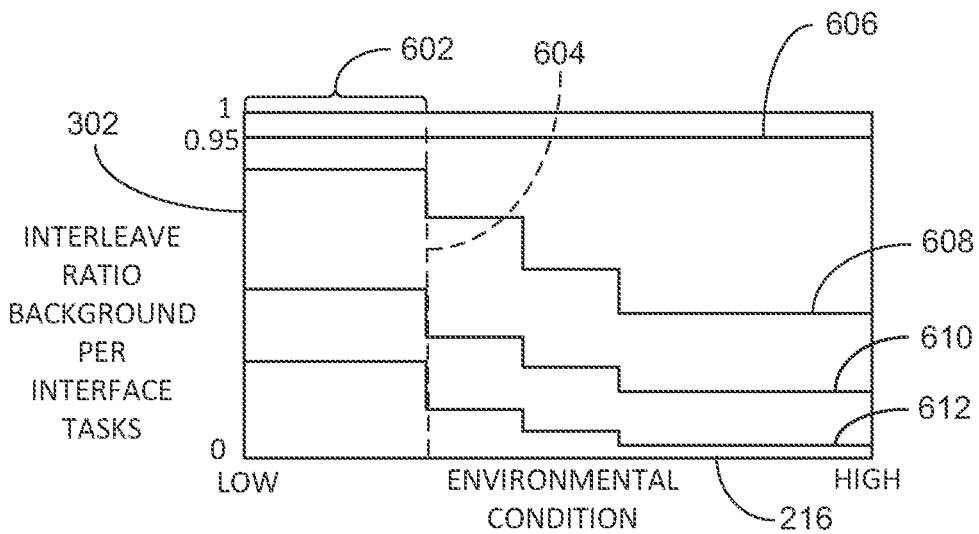
FIG. 6 shows a line graph of the interleave ratio of the background tasks to interface tasks in the presence of environmental conditions.

Referring now to FIG. 6, therein is shown a line graph 601 of the interleave ratio 302 of the background tasks to interface tasks in the presence of the environmental condition 216. The line graph 601 depicts a normal operating range 602 that represents a range of the environmental condition where the performance of background tasks can maintain the operational capacity of the electronic system 100 of FIG. 1A.

When the environmental condition 216 exceeds a capacity break 604, the interleave ratio 302 can be decreased due to the diminishing benefit of the background task 401 of FIG. 4. The capacity break 604 can represent the point at which the background task 401 consumes more of the available capacity percentage 502 of FIG. 5 than it can recover. Other step points can be calculated by the control circuitry 138 of FIG. 1A based on the history of the environmental condition 216, the success ratio 413 of FIG. 4, or a combination thereof. It is understood that the step points for the capacity ranges can be different but are shown in the same relative location for simplicity. In addition, while step functions are shown, other functions may be used in various embodiments. For example, as previously shown in FIG. 3, hysteresis control may be applied so that a different function may be applied when the environmental condition is returning from high to low.

The various lines 606, 608, 610 and 612 represent example response profiles of the system to increasing environmental condition (e.g., vibration) at different capacity levels, ranging from 606 representing an example response profile when the system has very low available media capacity remaining, to 612 representing an example response profile when the system has a relatively high available media capacity remaining.

A critically low available capacity response profile 606 can represent a response profile of the electronic system 100 of FIG. 1A operating in the urgency range 512 of FIG. 5, where the available capacity is extremely low. The critically low available capacity response profile 606 can have a constant slope across the environmental condition 216 due to the available capacity of the media 104 of FIG. 1A being 10% or less. As the environmental condition 216 increases in severity, the critically low available capacity 606 can be held at a constant level in an attempt to regain as much of the capacity as possible through the continued performance of background tasks at a relative high level in relation to interface tasks. It is understood that the critically low available capacity 606 can have a different profile and FIG. 6 is just an example of the performance of an embodiment of the electronic system 100. While the critically low available capacity response profile 606 is shown to have the interleave ratio 302 at substantially 0.95, this is an example only and the actual value of the interleave ratio 302 can differ.

A low available capacity response profile 608 can represent a profile of the electronic system 100 operating in the lower end of operational capacity range 508 of FIG. 5, where the available capacity is getting low. The low available capacity response profile 608 can have a constant slope until the capacity break 604 due to the available capacity of the media 104 being, for example, between 11% and 20%. As the environmental condition 216 increases in severity, the low available capacity response profile 608 can be decreased in a step function, as shown, or decreased in a linear or non-linear function. It is understood that the low available capacity response profile 608 can have a different profile and FIG. 6 is just an example of the performance of an embodiment of the electronic system 100. It is further understood that the range of the available capacity identified for the low available capacity 608 can be different.

A middle available capacity response profile 610 can represent a profile of the electronic system 100 operating in a middle range of the available capacity percentage 502 of FIG. 5, where the available capacity is in, for example, a 40-60% range of the available capacity percentage 502. The middle available capacity response profile 610 can have a constant slope until the capacity break 604 due to the available capacity of the media 104 being between 40% and 60%. As the environmental condition 216 increases in severity the middle available capacity 610 can be decreased in a step function, as shown, or decreased in a linear or non-linear function. It is understood that the middle available capacity 610 can have a different profile and FIG. 6 is just an example of the performance of an embodiment of the electronic system 100. It is further understood that the range of the available capacity identified for the middle available capacity response profile 610 can be different.

A high available capacity response profile 612 can represent a profile of the electronic system 100 operating in a range of 61-80% range of the available capacity percentage 502. The high available capacity response profile 612 can have a constant slope until the capacity break 604 due to the available capacity of the media 104 being between 61% and 80%. As the environmental condition 216 increases in severity the high available capacity response profile 612 can be decreased in a step function, as shown, or decreased in a linear or non-linear function. It is understood that the high available capacity response profile 612 can have a different profile and FIG. 6 is just an example of the performance of an embodiment of the electronic system 100. It is further understood that the range of the available capacity identified for the high available capacity response profile 612 can be different.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

These and other valuable aspects of an embodiment consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   a media;
   a head over the media;
   a head actuation motor coupled to the head; and
   control circuitry, coupled to the head actuation motor, configured to position the head; and
   wherein the control circuitry is further configured to adjust a frequency of a background task based on a success ratio of the background task.

2. The apparatus as claimed in claim 1 wherein the control circuitry is further configured to adjust a frequency of the background task based on an unused portion of the media.

3. The apparatus as claimed in claim 1 wherein the success ratio is determined based on a space consumed in a process of performing the background task.

4. The apparatus as claimed in claim 3 wherein the space consumed is determined based at least in part on data on sectors skipped while writing due to the environmental condition.

5. The apparatus as claimed in claim 1 wherein the success ratio is further determined at least in part on sectors freed by the background task.

6. The apparatus as claimed in claim 1 wherein the success ratio is determined based on a rate of space consumed in the process of performing the background task.

7. The apparatus as claimed in claim 1 wherein the success ratio is further determined based on a rate of sectors freed in the process of performing the background task.

8. The apparatus as claimed in claim 2 wherein the frequency of the background task is adjusted by comparing the success ratio to a threshold.

9. An apparatus comprising:
a media;
a head over the media;
a head actuation motor coupled to the head;
control circuitry, coupled to the head actuation motor, configured to position the head; and
an environmental sensor, coupled to the control circuitry, configured to measure a magnitude of an environmental condition;
wherein the control circuitry is further configured to:
perform a background task; and
adjust a frequency of the background task based on a magnitude of the environmental condition.

10. The apparatus as claimed in claim 9 wherein the control circuitry is further configured to adjust the frequency of the background task based on an unused portion of the media.

11. The apparatus as claimed in claim 9 wherein the background task includes garbage collection, file defragmentation, data compression, data encryption, or a combination thereof.

12. The apparatus as claimed in claim 9 wherein the environmental condition includes a vibration.

13. The apparatus as claimed in claim 9 wherein the environmental condition comprises a measure of a vibration, and the control circuitry is further configured to calculate an abort threshold of the background task based on a position error signal and the magnitude of the environmental condition.

14. The apparatus as claimed in claim 9 wherein the control circuitry is further configured to calculate a threshold of the frequency of the background task based on an unused portion of the media.

15. The apparatus as claimed in claim 9 wherein the control circuitry is further configured to apply a hysteresis of the frequency of the background task based on the magnitude of the environmental condition exceeds a recovery threshold.

16. The apparatus as claimed in claim 15 wherein the recovery threshold for applying the hysteresis is adjusted based on a history of the environmental condition.

17. The apparatus as claimed in claim 9 wherein the control circuitry is further configured to decrease the frequency of the background task if the magnitude of the environmental condition exceeds a severity threshold.

18. The apparatus as claimed in claim 9 wherein the control circuitry is further configured to increase the frequency of the background task if a free space generated by the background task exceeds a threshold.

19. A method of operating an apparatus, the method comprising:
flying a head over a media;
controlling a head actuation motor for positioning the head over the media; and
adjusting a frequency of a background task based on a success ratio of the background task.

20. The method as claimed in claim 19 further comprising determining the success ratio by monitoring the space consumed by performing the background task.

21. The method as claimed in claim 20 wherein determining the success ratio includes counting sectors skipped while writing due to an environmental condition.

22. The method as claimed in claim 20 wherein determining the success ratio includes counting sectors freed by the background task.

23. The method as claimed in claim 20 further comprising determining the success ratio by monitoring a rate of space consumed in the process of performing the background task.

24. The method as claimed in claim 20 further comprising adjusting the frequency of the background task by comparing the success ratio to a threshold.

25. A method of operating an apparatus, the method comprising:
flying a head over a media;
controlling a head actuation motor for positioning the head over the media;
measuring a magnitude of an environmental condition by an environmental sensor; and
controlling a frequency of a background task based on the measured magnitude of the environmental condition.

26. The method as claimed in claim 25 further comprising adjusting the frequency of the background task based on an unused portion of the media.

27. The method as claimed in claim 25 wherein controlling the frequency of the background task includes controlling the frequency of garbage collection, file defragmentation, data compression, data encryption, or a combination thereof.

28. The method as claimed in claim 25 wherein measuring of the magnitude of the environmental condition includes measuring a vibration.

29. The method as claimed in claim 25 further comprising calculating an abort threshold of the background task based on a position error signal and the magnitude of the environmental condition.

30. The method as claimed in claim 25 further comprising calculating a threshold of the frequency of the background task based on an unused portion of the media.

31. The method as claimed in claim 25 further comprising applying a hysteresis of the frequency of the background task based on the magnitude of the environmental condition exceeding a recovery threshold.

32. The method as claimed in claim 31 further comprising adjusting the recovery threshold for applying the hysteresis based on a history of the environmental condition.

33. The method as claimed in claim 25 further comprising calculating a severity threshold for decreasing the frequency of the background task based on the magnitude of the environmental condition.

34. The method as claimed in claim 25 further comprising increasing the frequency of the background task based on the background task generating a free exceeding a threshold.

35. The method as claimed in claim 25 further comprising adjusting the frequency of the background task based on a ratio of the background tasks to interface tasks.

* * * * *